United States Patent [19]

Meeks

[11] 4,173,263
[45] Nov. 6, 1979

[54] DIGITAL WEIGHING SCALE

[75] Inventor: Frederick T. Meeks, Asheboro, N.C.

[73] Assignee: General Electric Company, New York, N.Y.

[21] Appl. No.: 853,449

[22] Filed: Nov. 21, 1977

[51] Int. Cl.$^2$ ............... G01G 3/14; G01G 21/08
[52] U.S. Cl. ............... 177/210 EM; 177/256
[58] Field of Search ........ 177/210 R, 210 EM, 210 F, 177/DIG. 3, 256

[56] References Cited

U.S. PATENT DOCUMENTS

| 3,469,645 | 9/1969 | Provi et al. | 177/210 R |
| 3,692,129 | 9/1972 | Pratt et al. | 177/DIG. 3 |
| 3,724,574 | 4/1973 | Hutchinson et al. | 177/210 |
| 3,780,818 | 12/1973 | Lumby et al. | 177/256 |
| 3,786,678 | 1/1974 | Kunz | 177/210 |
| 3,887,797 | 6/1975 | Nishiguchi | 177/210 |

Primary Examiner—George H. Miller, Jr.
Attorney, Agent, or Firm—John F. Cullen; George R. Powers; Leonard J. Platt

[57] ABSTRACT

A digital platform scale having a base and movable cover thereon with a lever system in the base converting vertical movement to horizontal lever movement, spring means connected to the base and lever to counter-balance the lever movement and a differential transformer connected to the lever system and to an electrical digital readout to display weight, an improvement is provided that disposes the spring horizontally in the base and connected to the lever system at its point of maximum movement. A differential transformer is interposed as part of the connection between the spring and the lever system and axially aligned with the spring. The transformer is an outer fixed winding in the form of a hollow cylinder connected to the readout and the inner core, connecting the spring and lever system, is spaced from the winding within the cylinder avoiding contact therewith whereby the core is the sole integral direct link of the balance system at its greatest travel for maximum sensitivity and minimum friction in the system.

5 Claims, 4 Drawing Figures

DIGITAL WEIGHING SCALE

BACKGROUND OF THE INVENTION

1. Field of the Invention

The invention relates to a digital platform scale of the general type of home weighing scale that is connected to an electrical digital readout and, more particularly, to a differential transformer mechanism that is the sole integral link of the balance system directly in line with the bias spring for maximum sensitivity and minimum frictional effect on the system.

2. Description of the Prior Art

The common household bathroom scale having a base and a weight supporting cover with an internal lever system biased by a coil spring and the lever system actuating a readout, usually in the form of a rotating calibrated dial, is well known. Improvements have been proposed in the general combination that employ digital readouts as in U.S. Pat. No. 4,041,289 and in scales that are electronically operated by coils or differential transformers with the readout being directly on the scale or at a remote point. Typical of the coil is shown in U.S. Pat. No. 3,469,645 and differential transformer is shown in U.S. Pat. No. 3,887,797. All such scales either locate the sensor at a point removed from the maximum lever travel or employ a sensor and/or readout that imposes some frictional resistance on the movement of the lever system e.g. a dial mechanism or rack and pinion operating off the lever system. Any improvements on such scales are generally directed to increasing sensitivity and minimizing the friction inherent in the system to provide for more accurate readings and it is to this end that the present invention is directed.

SUMMARY OF THE INVENTION

Briefly described, the invention is directed to a digital platform scale with a base and weight supporting cover movable with respect to the base, a lever system in the base that converts vertical cover to horizontal lever, movement, and spring means connecting the base and lever system for counter-balancing lever movement. A sensor in the form of a differential transformer is connected to the lever system and to an electrical digital readout to display the weight of an object on the cover. To this known combination, an improvement comprises disposing the spring horizontally in the base and directly and adjustably connecting it to the horizontal lever system at its point of maximum movement generally being the center of a symmetrical lever system. The transformer is in the form of a hollow cylinder with a core movable axially thereof and the spring counter-balancing system includes the movable core connected between the spring and the lever in alignment and forming an integral link of the balance system directly in line with the spring. The winding adjacent the core is connected to activate a digital readout fixed to the cover. The combination is arranged so that the core of the transformer, being an integral direct and sole link of the balance system at its greatest point of travel, provides maximum sensitivity and minimum friction on the system. Thus, the main object of the invention is to provide a differential transformer sensing system in a spring-biased lever weighing scale where the transformer is the sole integral link, meaning all the load must go through the link, of the balance system directly in line with the spring for higher sensitivity and substantially no resistance to movement of the lever system.

DESCRIPTION OF THE PREFERRED EMBODIMENT

Figure 1:
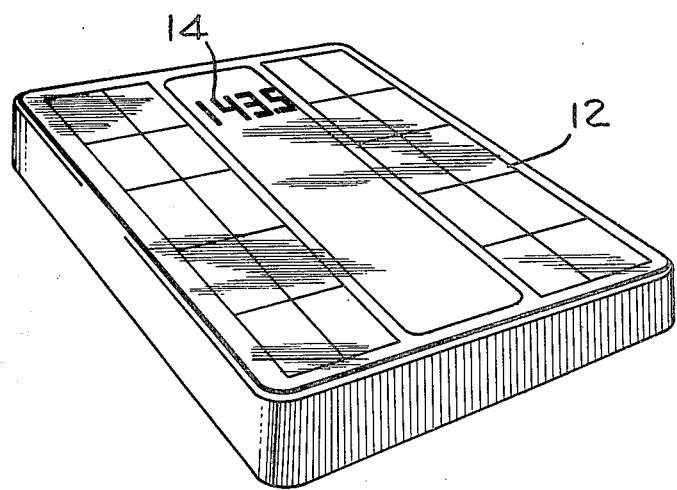
FIG. 1 is a perspective of a low profile bathroom scale.

Referring to the drawings, a common bathroom-type scale employing the instant invention is shown but may take any suitable form such as the rectangular form shown and includes a base 10 that is closed by a weight supporting cover 12 upon which a person may stand. The cover 12 is movable in the normal fashion against the fixed base and weight is read in the form of a digital readout 14 through an appropriate window in the cover. The scale is activated through a known symmetrical lever system 16 disposed in the base and of the general type as shown in U.S. Pat. Nos. 3,469,645 and 3,478,618. No claim is made to the lever system per se since it is known construction as shown in said patents which convert vertical movement of cover 12 to horizontal movement of the internal lever system 16. As such, movement of the lever system is counter-balanced by an adjustable horizontally disposed coiled spring 18 connected to the base and to the lever system in some suitable fashion. For operating weight indicating indicia, the connection usually consists of intermediate linkage structure to activate a rack and pinion for rotating a weight-indicating dial passing under a window as in said 3,478,618 patent or weight may be indicated electronically as in U.S. Pat. No. 4,041,289 or by intermediate linkage such as a potentiometer driven by a gear as in said U.S. Pat. No. 3,469,645 to convert to a digital readout. Both of these types of structure employ extra or side linkage which inherently involves friction on the movable system thus introducing possible errors and both require separate take-offs that do not inherently employ the maximum travel of the movable lever system to indicate weight.

Figure 2:
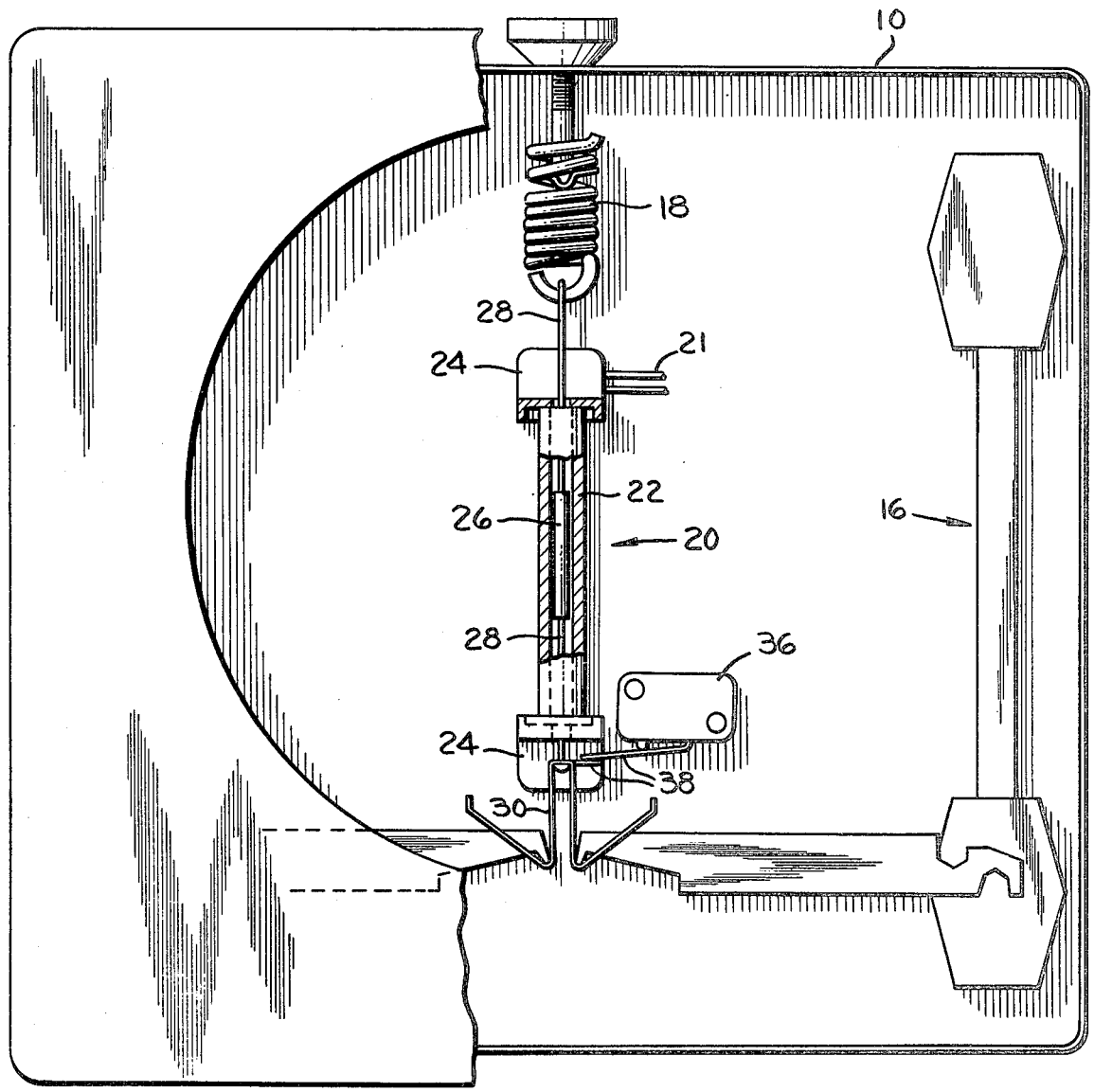
FIG. 2 is a plan view, partially in section, showing part of a lever system and the transformer connections.
Figure 3:
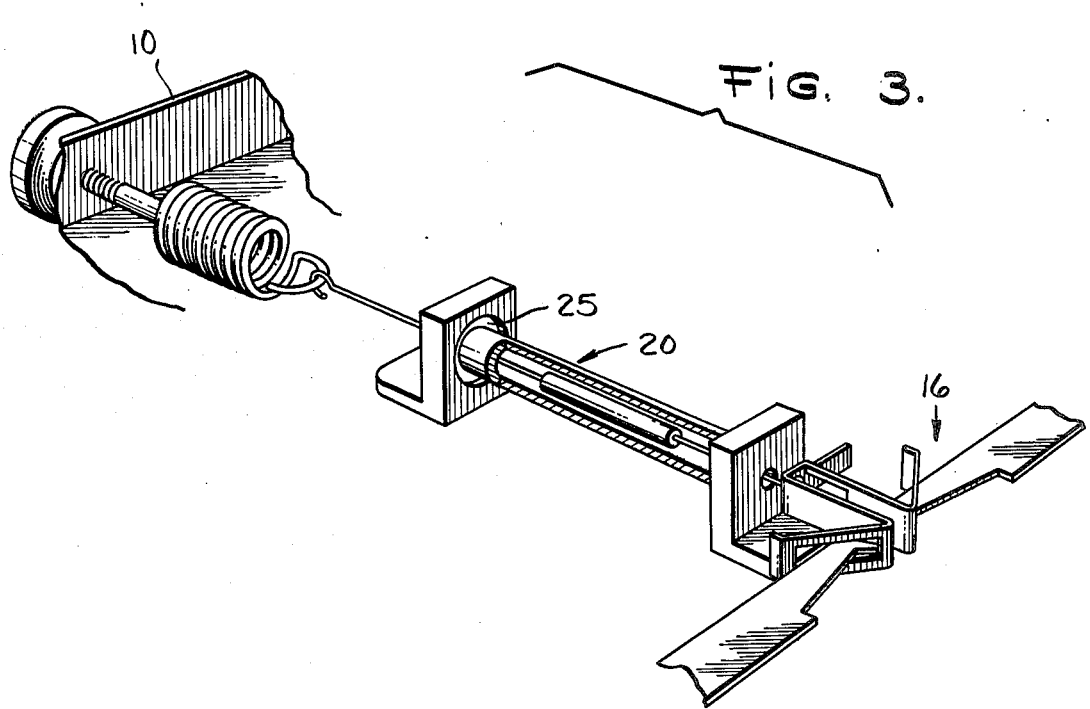
FIG. 3 is a partial perspective of the components in FIG. 2 and, FIG. 4 is a block diagram of the operation of the digital scale.

In accordance with the invention, differential transformer 20 better known as a linear voltage differential transformer or LVDT is employed as a direct and only link in the counter-balancing system and is disposed between the lever system 16 and the counter-balancing spring 18 to connect the two as the only or sole connection therebetween. The use of differential transformers for detecting movement is known as in U.S. Pat. No. 3,887,797 in a beam scale of a different type and in U.S. Pat. No. 3,786,678 that employs an electro-magnetic load compensating means in a different combination. As disposed in the present invention, differential transformer 20 is the one direct aligned and sole link between spring 18 and lever system 16 and is disposed to link the two at the point of maximum lever movement as shown in FIG. 2. Since the purpose of the improvement in the present invention is to maximize the sensitivity with minimum friction, the transformer is formed of an outer coil winding 22 in the general form of a hollow cylinder that is substantially fixed to the base against aligned longitudinal movement between the spring and levers but allowed to move or float sideways and vertically by any suitable mounting arrangement such as brackets 24 having enlarged recesses 25 and fixed to the base 10. Thus, the coil is defined as floatingly fixed meaning it can adjust itself in all but the aligned direction in which it is fixed or stationary. Coaxially disposed within the winding is an inner core 26 of a size sufficiently smaller than the central portion of winding 22 so that it is spaced from the winding to prevent any contact between the two during core movement. The core forms the only and direct aligned link through rods 28 with spring 18 at one end and lever 16 at the other end. The connection is such that the coil 22 essentially floats in all but the aligned direction where it must be held for a sensor pick up of movement of the core 26 so it continuously adjusts itself against an imperfect mechanical system and spring 18, core 26 and lever system 16 are always directly aligned and connected by link member 30 at the point of maximum travel when a preferred system such as that shown is symmetrical about a centerline that includes the connected spring 18 and core 26. Thus, the differential transformer 20 is a direct, axially, self-aligned, substantially frictionless and sole link between the spring 18 and lever system 16 at the point of maximum travel of the lever system. As such, it provides for maximum sensitivity and minimum friction at all times on the system. Actually, there is substantially no friction whatever except for cutting lines of magnetic force between the core and windings so the sensor 20 is substantially frictionless.

Figure 4:
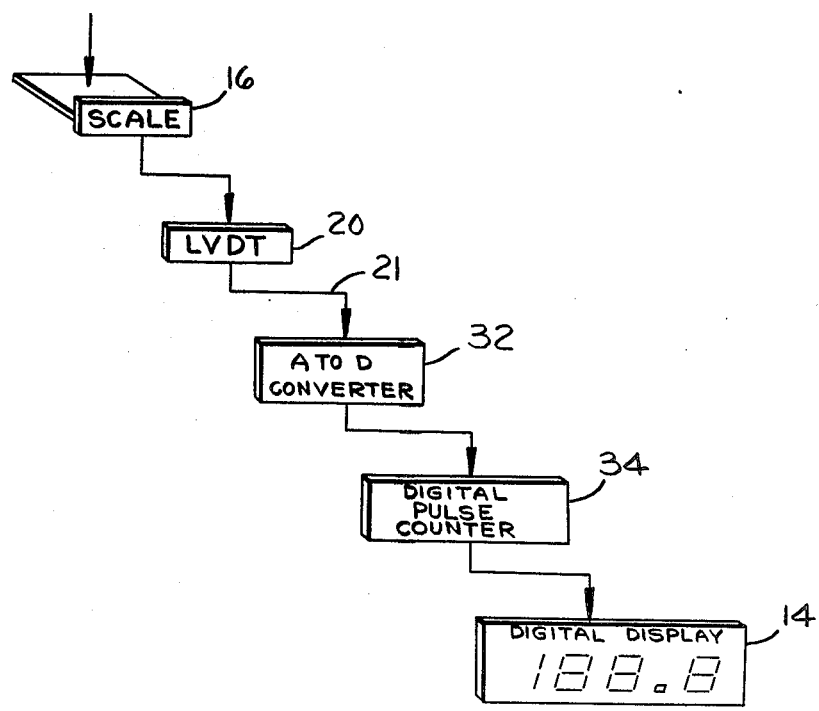

For actuating the digital readout 14, a suitable connection 21, forming no part of the present invention, may be made from windings 22 to respond and operate an analog to digital converter 32 which in turn triggers a digital pulse counter 34 to activate the digital display 14 as shown on the block diagram of FIG. 4.

With the system disclosed, whereby the differential transformer 20 is the direct and only link in the counter-balance system and with the axial alignment for joint movement of the core, lever, and spring along the common maximum lever travel path, the result is a rapid readout of maximum sensitivity in a very low and practically frictionless system in the transformer link for rapid and accurate response to movement of the lever system upon application of weight to cover 12. In order to make the device portable, it may be battery operated and be activated only on application of weight by a suitable microswitch 36 fixed to base 10 and containing cooperating arms 38, one connected directly to the core rod 28 so that switch 36 is activated only on lever and core movement downward in FIG. 2 to separate arms 38 during application of weight to the cover to thus energize the readout without applying any friction during weighing counter-balancing.

Thus, the present invention utilizes a differential transformer as a direct and only connection in the counter-balanced lever system at the point of maximum travel for maximum sensitivity and practically frictionless operation for quick digital readout upon the application of weight.

While there has been described a preferred form of the invention, obvious equivalent variations are possible in light of the above teachings. It is therefore to be understood that, within the scope of the appended claims, the invention may be practiced otherwise than as specifically described, and the claims are intended to cover such equivalent variations.

I claim:

1. In a digital platform scale having a base and weight supporting cover movable thereon, a lever system in the base converting vertical cover to horizontal lever movement, spring means connecting said base and lever system counter-balancing lever movement, a differential transformer connected to the lever system and to an electrical digital readout to display the weight of an object on the cover, the improvement comprising,
   said spring being disposed horizontally in said base and directly and adjustably connected to said horizontal lever system at its point of maximum movement,
   said spring connection including a movable differential transformer core as the sole link between the spring and lever and connected to each,
   an alignedly fixed winding adjacent said core and connected to activate said readout,
   said winding being floatingly fixed to said base,
   whereby the core is an integral direct and sole link of the balance system at its greatest travel for maximum sensitivity and minimum friction on the system.

2. Apparatus as described in claim 1 wherein said spring and core are axially aligned for joint movement along the same maximum travel path.

3. Apparatus as described in claim 2 wherein said lever system is symmetrical about the spring and core connection thereto.

4. Apparatus as described in claim 3 wherein said differential transformer is coaxial and comprises,
   an outer coil winding in the form of a hollow cylinder connected to said readout, and
   said inner transformer core being spaced from said winding within said cylinder to prevent contact therebetween during core movement.

5. Apparatus as described in claim 4 wherein said core connection has an arm extending therefrom, and switch means fixed to the base,
   whereby said arm activates the switch on lever and core movement on application of weight to the cover to energize said readout.

* * * * *